United States Patent
Plebani et al.

(10) Patent No.: US 11,960,988 B2
(45) Date of Patent: Apr. 16, 2024

(54) LEARNING METHOD, CORRESPONDING SYSTEM, DEVICE AND COMPUTER PROGRAM PRODUCT TO UPDATE CLASSIFIER MODEL PARAMETERS OF A CLASSIFICATION DEVICE

(71) Applicant: STMICROELECTRONICS S.r.l., Agrate Brianza (IT)

(72) Inventors: Emanuele Plebani, Sotto Il Monte Giovanni XXIII (IT); Danilo Pietro Pau, Sesto San Giovanni (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 1500 days.

(21) Appl. No.: 15/903,605

(22) Filed: Feb. 23, 2018

(65) Prior Publication Data
US 2018/0247194 A1    Aug. 30, 2018

(30) Foreign Application Priority Data
Feb. 27, 2017    (IT) .......................... 102017000021585

(51) Int. Cl.
*G06N 3/08*    (2023.01)
*G06N 3/084*    (2023.01)
*G06N 7/01*    (2023.01)

(52) U.S. Cl.
CPC ............... *G06N 3/08* (2013.01); *G06N 3/084* (2013.01); *G06N 7/01* (2023.01)

(58) Field of Classification Search
CPC ..................................................... G06N 3/08
See application file for complete search history.

(56) References Cited

U.S. PATENT DOCUMENTS

| | | | |
|---|---|---|---|
| 5,412,753 A | 5/1995 | Alston et al. | |
| 2003/0234519 A1* | 12/2003 | Farmer ................. | G06V 10/771 280/728.1 |
| 2005/0271280 A1* | 12/2005 | Farmer .................. | G06V 40/10 382/104 |
| 2006/0265489 A1 | 11/2006 | Moore | |

(Continued)

FOREIGN PATENT DOCUMENTS

| | | |
|---|---|---|
| CN | 101814149 A | 8/2010 |
| CN | 105184229 A | 12/2015 |

(Continued)

OTHER PUBLICATIONS

Reyes-Ortiz, Jorge-L., et al. "Transition-aware human activity recognition using smartphones." Neurocomputing 171 (2016): 754-767. (Year: 2016).*

(Continued)

*Primary Examiner* — Tsu-Chang Lee
(74) *Attorney, Agent, or Firm* — Seed IP Law Group LLP

(57) ABSTRACT

A classification device receives sensor data from a set of sensors and generates, using a context classifier having a set of classifier model parameters, a set of raw predictions based on the received sensor data. Temporal filtering and heuristic filtering are applied to the raw predictions, producing filtered predictions. A prediction error is generated from the filtered predictions, and model parameters of the set of classifier model parameters are updated based on said prediction error. The classification device may be a wearable device.

28 Claims, 2 Drawing Sheets

(56) References Cited

U.S. PATENT DOCUMENTS

| | | | | |
|---|---|---|---|---|
| 2009/0006346 | A1* | 1/2009 | C N | G06F 16/24537 |
| 2012/0283948 | A1* | 11/2012 | Demiryurek | G01C 21/3492 |
| | | | | 701/533 |
| 2017/0290531 | A1* | 10/2017 | Kamath | A61B 5/742 |

FOREIGN PATENT DOCUMENTS

| | | |
|---|---|---|
| CN | 105279773 A | 1/2016 |
| CN | 105303198 A | 2/2016 |
| CN | 105320957 A | 2/2016 |
| FR | 2 684 472 A1 | 6/1993 |

OTHER PUBLICATIONS

Esmael, Bilal, et al. "Improving time series classification using Hidden Markov Models." 2012 12th International Conference on Hybrid Intelligent Systems (HIS). IEEE, 2012. (Year: 2012).*

Jiang, Wenchao, and Zhaozheng Yin. "Human activity recognition using wearable sensors by deep convolutional neural networks." Proceedings of the 23rd ACM international conference on Multimedia. 2015. (Year: 2015).*

Hewahi et al., "Learning Concept Drift Using Adaptive Training Set Formation Strategy," *International Journal of Technology Diffusion* 4(1):33-55, 2013.

Hyvärinen et al., "Unsupervised Feature Extraction by Time-Contrastive Learning and Nonlinear ICA," $30^{th}$ *Conference on Neural Information Processing Systems (NIPS 2016)*, Barcelona, Spain, 2016, 9 pages.

Italian Search Report and Written Opinion, dated Oct. 26, 2017, for Italian Application No. 201700021585, 10 pages.

Li et al., "Learning without Forgetting," arXiv 1606.09282v3, 2017, 13 pages.

Lotter et al., "Deep Predictive Coding Networks for Video Prediction and Unsupervised Learning," arXiv 1605.08104v5, 2017, 18 pages.

McMahan et al., "Federated Learning of Deep Networks using Model Averaging," arXiv 1602.05629v1, 2016, 11 pages.

Noroozi et al., "Unsupervised Learning of Visual Representations by Solving Jigsaw Puzzles," arXiv 1603.09246v3, 2017, 19 pages.

Yao et al., "DeepSense: A Unified Deep Learning Framework for Time-Series Mobile Sensing Data Processing," arXiv 1611.01942v1, 2016, 9 pages.

Shanqing et al., "A Fast and Adaptive Object Tracking Method," *Journal of Computer Research and Development* 49(2):383-391, 2012.

* cited by examiner

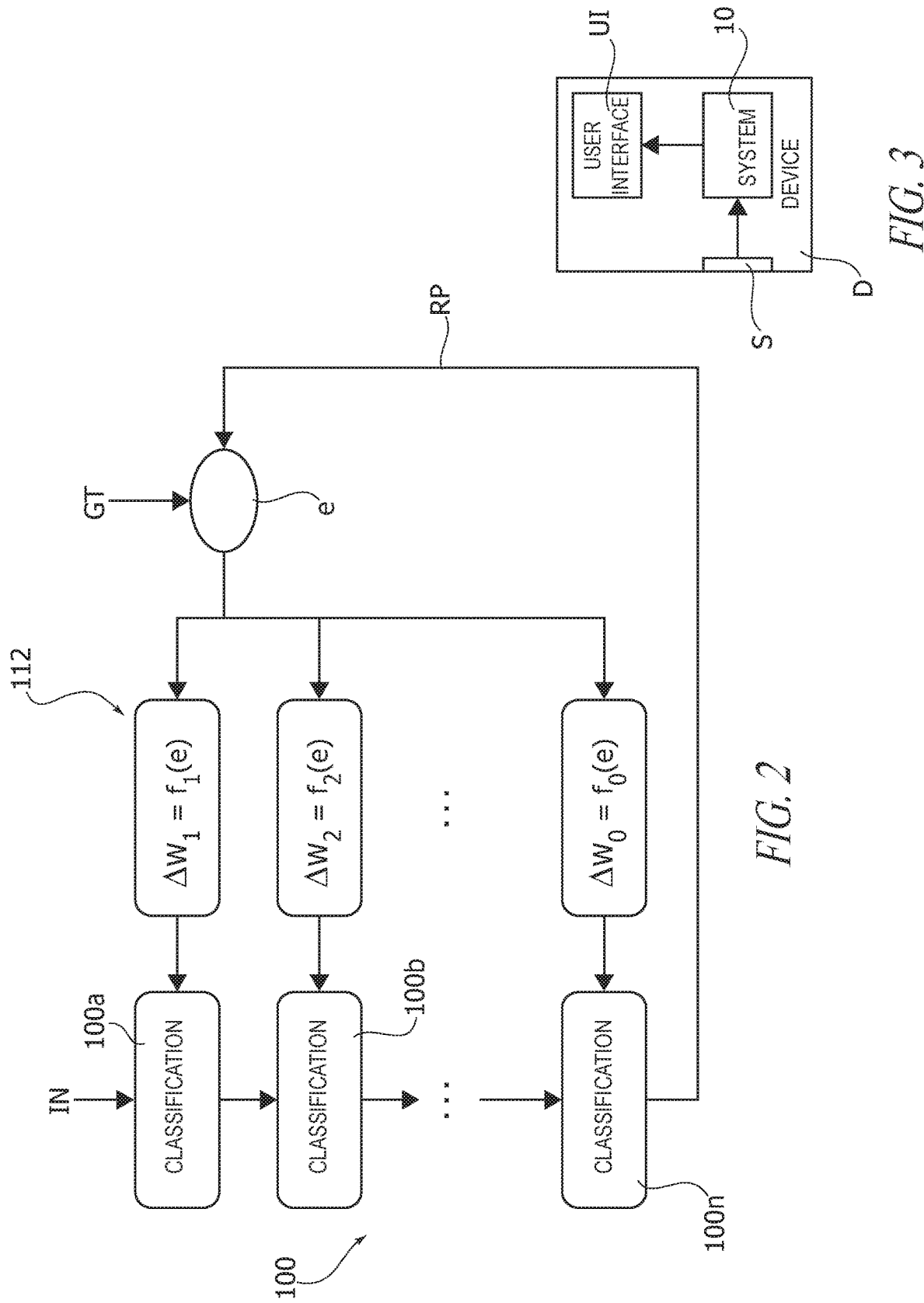

LEARNING METHOD, CORRESPONDING SYSTEM, DEVICE AND COMPUTER PROGRAM PRODUCT TO UPDATE CLASSIFIER MODEL PARAMETERS OF A CLASSIFICATION DEVICE

BACKGROUND

Technical Field

The description relates to learning methods for electronic devices, such as self-supervised learning, e.g., based on temporal consistency, for use, e.g., in wearable devices.

Description of the Related Art

Wearable devices are becoming commonplace in the market thanks to their decreasing cost and the improved accuracy of environmental and inertial sensors, with the market moving towards further intelligence added to the behavior of the devices.

Usually, an application-specific classifier may be installed in such a device in order to provide real-time prediction of the context (e.g., type of movement of the user or ambient sound).

Classifiers installed in wearable devices may be based on hand-chosen features followed by a general purpose classifier (e.g., Support Vector Machines or decision trees).

Such classifiers may be trained on large curated datasets without contemplating updates once the classifier is installed in the device.

This may lead to various drawbacks such as, e.g.:

errors in the classifier cannot be corrected until a new firmware or an updated device is released, a classifier cannot be personalized for a specific user and may benefit (only) from being accurate over a wide range of scenarios and user behaviors.

BRIEF SUMMARY

In an embodiment, a method comprises: receiving sensor data from a set of sensors; running a context classifier of said sensor data to produce therefrom a set of raw predictions, wherein said context classifier includes a set of classifier model parameters; applying to said raw predictions temporal filtering as well as heuristic filtering to produce filtered predictions; calculating a prediction error from said filtered predictions; updating said context classifier by applying to parameters in said set of classifier model parameters updates calculated as a function of said prediction error. In an embodiment, said temporal filtering includes filtering said raw predictions over a time window facilitating averaging out of prediction errors. In an embodiment, said temporal filtering of said raw predictions includes one or more of: voting filtering to select a raw prediction occurring more frequently over a time window; and averaging to select a most likely raw prediction over a time window. In an embodiment, the method includes: detecting class transitions in said context classifier; and aligning said time window for temporal filtering with said class transitions in said context classifier. In an embodiment, said heuristic filtering includes selecting transitions between a source class and a destination class in said context classifier for which a number of predictions of the destination class reaching a confirmation threshold have been detected over a temporal window. In an embodiment, said heuristic filtering includes: providing a confusion matrix identifying mis-classification pairs in said context classifier; detecting mis-classification pairs in said raw predictions having a probability higher than a mis-classification threshold and replacing the raw predicted class therein with an estimated true class. In an embodiment, the heuristic filtering is applied following temporal filtering. In an embodiment, the method includes: applying low-latency filtering to said raw predictions; and presenting said low-latency filtered raw predictions as user feedback. In an embodiment, said raw predictions include probability distributions over recognizable target classes. In an embodiment, said calculating a prediction error from the filtered predictions includes calculating said prediction error from a subset of said filtered predictions, said subset selected by one or more of: when said raw predictions include probability distributions over recognizable target classes, selecting predictions with a probability higher than a selection threshold, and having the selected subset including an equal number of samples for each class in said classifier. In an embodiment, the method includes: logging a sequence of said sensor data corresponding to a set of respective filtered predictions, forming a set of sensor data/filtered predictions pairs, and adding said set of sensor data/filtered predictions pairs to the training set for said context classifier.

In an embodiment, a system includes: a context classifier for receiving sensor data from a set of sensors and producing therefrom a set of raw predictions, wherein said context classifier includes a set of classifier model parameters, temporal filtering and heuristic filtering circuits for receiving said raw predictions and producing filtered predictions therefrom, an update module for calculating a prediction error from said filtered predictions, and updating said context classifier by applying to parameters in said set of classifier model parameters updates calculated as a function of said prediction error. In an embodiment, the system employs one or more of the methods disclosed herein. In an embodiment, a wearable device includes a system as disclosed herein. In an embodiment, the wearable device includes a set of sensors which provide sensor data to said context classifier network. In an embodiment, the wearable device includes a user interface to present user feedback indicative of said raw predictions. In an embodiment, a computer product program loadable in the memory of at least one processing module includes software code portions for executing the steps of one or more of the methods disclosed herein.

One or more embodiments may include a corresponding system (e.g., a circuit to be embedded in a wearable device), a corresponding (e.g., wearable) device as well as a computer program product loadable in the memory of at least one processing module (e.g., a computer) and including software code portions for executing the steps of the method when the product is run on at least one processing module. As used herein, reference to such a computer program product is understood as being equivalent to reference to a computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may include a self-supervised learning algorithm for embedded devices running a context classifier (e.g., predicting the activity of a user).

In one or more embodiments, the exploitation of temporal consistency between different predictions may provide a supervisory signal for the classifier.

In one or more embodiments, a classifier in a device may be updated online by pre-computing a classifier update step.

One or more embodiments may involve storing only the classifier error, leading to reduced memory requirements.

Advantages of one or more embodiments may include one or more of the following:

continuously updating a classifier "on board" an embedded device is possible, leading to improved predictions over time;

a training procedure is made possible even without contacting a remote server (with the communication burden involved), while also possibly avoiding communication and storage of user data (which may provide a form of privacy-preserving learning as a by-product);

in devices used mostly by a single user, one or more embodiments may provide a form of fine-tuning on the specific user, at least insofar as the behavior of a certain user does not differ appreciably from a reference behavior encoded by an original ("un-tuned") model;

if sufficient storage capability is available in the device, one or more embodiments may implement a model switch based on a selected user profile, or a user detection based on a different procedure.

Adoption of one or more embodiments in a device may facilitate exchanging limited data between a server and the device while updating the parameter memory over time using on-board training. Also, one or more embodiments may involve storing past information in order to train a new model, for example, in a dedicated memory space, which may facilitate reduced (possibly even virtually nil) server communication.

In an embodiment, a method comprises: receiving sensor data from a set of sensors; generating, using a context classifier having a set of classifier model parameters, a set of raw predictions based on the received sensor data; applying to said raw predictions temporal filtering and heuristic filtering, producing filtered predictions; generating a prediction error from said filtered predictions; and updating model parameters of said set of classifier model parameters based on said prediction error. In an embodiment, said temporal filtering includes filtering said raw predictions over a time window. In an embodiment, said temporal filtering of said raw predictions includes one or more of: voting filtering to select a raw prediction occurring more frequently over a time window; and averaging to select a most likely raw prediction over a time window. In an embodiment, the method comprises: detecting class transitions in said context classifier; and aligning said time window with said class transitions. In an embodiment, said heuristic filtering includes selecting transitions between a source class and a destination class in said context classifier for which a number of predictions of the destination class reaching a confirmation threshold have been detected over a temporal window. In an embodiment, said heuristic filtering includes: providing a confusion matrix identifying mis-classification pairs in said context classifier; and detecting mis-classification pairs in said raw predictions having a probability higher than a mis-classification threshold and replacing a raw predicted class associated with a detected mis-classification pair with an estimated true class. In an embodiment, the method comprises applying said heuristic filtering following said temporal filtering. In an embodiment, the method comprises: applying low-latency filtering to said raw predictions; and presenting said low-latency filtered raw predictions as user feedback. In an embodiment, said raw predictions include probability distributions over recognizable target classes. In an embodiment, said generating a prediction error from the filtered predictions includes selecting a subset of said filtered predictions and generating said prediction error from the subset of said filtered predictions, the selecting the subset including at least one of: when said raw predictions include probability distributions over recognizable target classes, selecting predictions with a probability higher than a selection threshold; and including in the selected subset an equal number of samples for each class in said classifier. In an embodiment, the method comprises: logging a sequence of said sensor data corresponding to a set of respective filtered predictions; forming a set of sensor data/filtered predictions pairs; and adding said set of sensor data/filtered predictions pairs to a training set for said context classifier.

In an embodiment, a system comprises: a memory; and classification circuitry coupled to the memory, wherein the classification circuitry, in operation: receives sensor data; generates, using a set of classifier model parameters, a set of raw predictions based on the received sensor data; filters the raw predictions using temporal filtering and heuristic filtering, producing filtered predictions; generates a prediction error from said filtered predictions; and updates model parameters of said set of classifier model parameters based on said prediction error. In an embodiment, said temporal filtering includes filtering said raw predictions over a time window. In an embodiment, said temporal filtering of said raw predictions includes one or more of: voting filtering to select a raw prediction occurring more frequently over a time window; and averaging to select a most likely raw prediction over a time window. In an embodiment, the classification circuitry, in operation: detects class transitions in the raw predictions; and aligns said time window with said detected class transitions. In an embodiment, said heuristic filtering includes selecting transitions between a source class and a destination class for which a number of predictions of the destination class reaching a confirmation threshold have been detected over a temporal window. In an embodiment, said heuristic filtering includes: providing a confusion matrix identifying mis-classification pairs; and detecting a mis-classification pair in said raw predictions having a probability higher than a mis-classification threshold and replacing a raw predicted class associated with the detected mis-classification pair with an estimated true class. In an embodiment, the classification circuitry, in operation, applies said heuristic filtering following said temporal filtering. In an embodiment, the classification circuitry, in operation: applies low-latency filtering to said raw predictions; generates user-feedback based on said low-latency filtered raw predictions. In an embodiment, said raw predictions include probability distributions over recognizable target classes. In an embodiment, said classification circuitry, in operation, selects a subset of said filtered predictions and generates said prediction error from the subset of said filtered predictions, the selecting the subset including at least one of: when said raw predictions include probability distributions over recognizable target classes, selecting predictions with a probability higher than a selection threshold; and including in the selected subset an equal number of samples for each classification class. In an embodiment, the classification circuitry, in operation: logs a sequence of said sensor data corresponding to a set of respective filtered predictions; forms a set of sensor data/filtered predictions pairs; and adds said set of sensor data/filtered predictions pairs to a training set to train the classification circuitry. In an embodiment, the system comprises: a set of sensor coupled to the classification circuitry, wherein the set of sensors, in operation, generates the sensor data. In an embodiment, the system comprises a user interface coupled to the classification circuitry, wherein the user interface, in operation, provides user feedback indicative of the raw predictions. In an embodiment, the system comprises: a wearable device including at least the set of sensors and the user interface.

In an embodiment, a non-transitory computer-readable medium's contents configure classification circuitry to perform a method, the method comprising: generating, using a classification model including a set of classifier model parameters, a set of raw predictions based on sensor data; applying to said raw predictions temporal filtering and heuristic filtering, producing filtered predictions; generating a prediction error from said filtered predictions; and updating model parameters of said set of classifier model parameters based on said prediction error. In an embodiment, said temporal filtering includes filtering said raw predictions over a time window. In an embodiment, the contents comprise instructions executed by the classification circuitry.

BRIEF DESCRIPTION OF THE SEVERAL VIEWS OF THE DRAWINGS

One or more embodiments will now be described, by way of example only, with reference to the annexed figures, wherein:

FIG. 2 is a functional block diagram exemplary of possible operation of one or more embodiments; and FIG. 3 is schematically representative of a device according to one or more embodiments.

DETAILED DESCRIPTION

Figure 1:
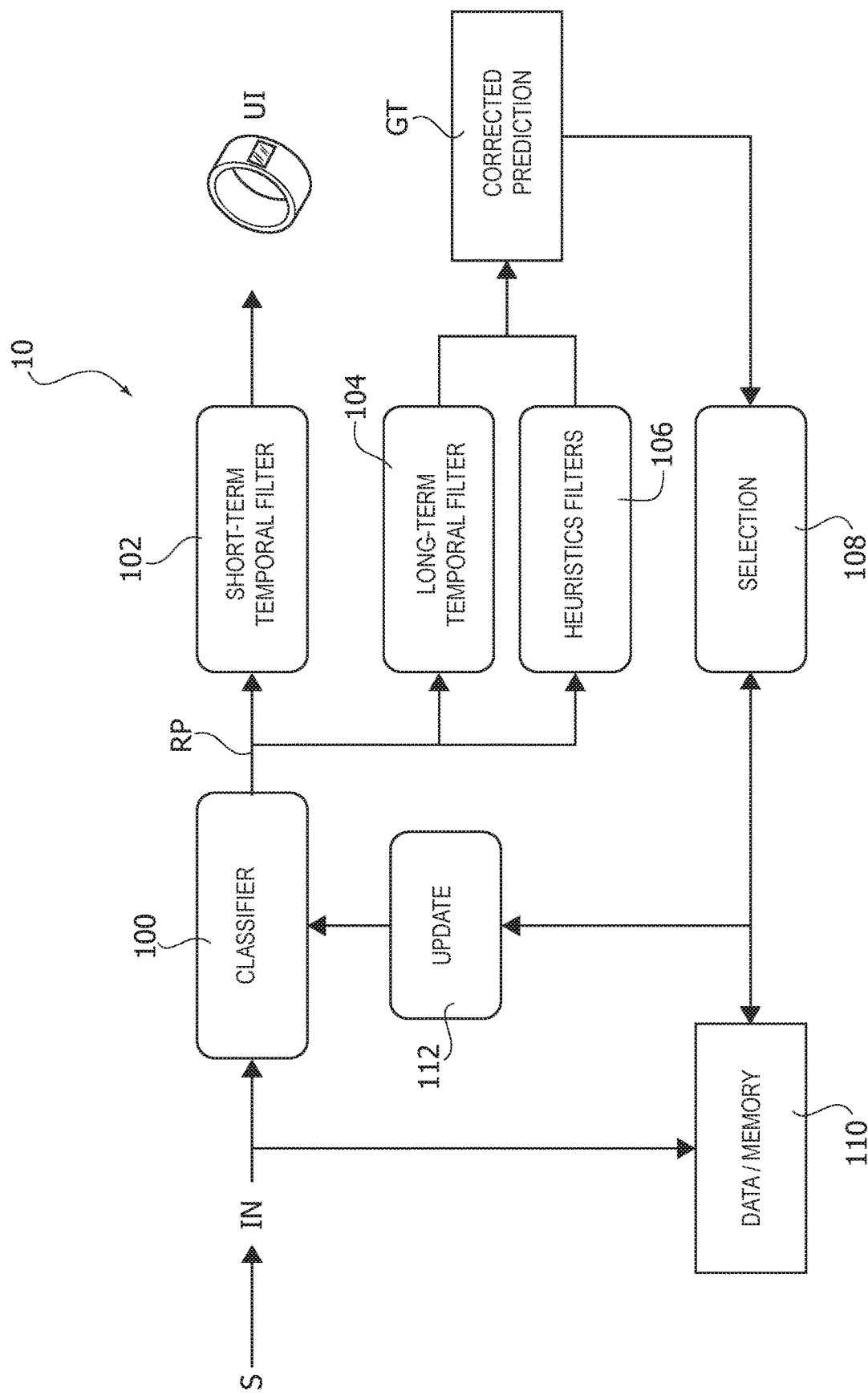
FIG. 1 is a block diagram exemplary of one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

By way of general background, one may note that supervised training may benefit from the availability of an annotated dataset, while un-supervised training may exhibit less satisfactory performance.

A middle ground is "self-supervised learning" where heuristics, such as temporal consistency, may be used to provide annotated data without involving a user's intervention.

One or more embodiments may involve the recognition that, in addition to being applicable to images (see, Noroozi, M., & Favaro, P., *Unsupervised Learning of Visual Representations by Solving Jigsaw Puzzles*, ECCV (pp. 69-84). Computer Vision and Pattern Recognition, Amsterdam, Netherlands (2016)), videos (see, Lotter, W., Kreiman, G., & Cox, D., *Deep Predictive Coding Networks for Video Prediction and Unsupervised Learning*, Arxiv 1605.08104 (2016)), and in predicting the order of temporal sequences (see, Hyvarinen, A., & Morioka, H., *Unsupervised Feature Extraction by Time-Contrastive Learning and Nonlinear ICA*, Arxiv 1605.06336 (2016), self-supervised learning may be applied also in updating a model in an online fashion, e.g., by being deployed in an embedded platform with associated computational and memory constraints.

One or more embodiments as exemplified in the block diagrams of FIGS. 1 and 3 may include a system 10, which, in operation, implements a learning framework which may run (e.g., solely) on an embedded platform and with the weights therein updated based on an implicit learning signal.

In one or more embodiments, provided a (time) window of sufficient length is available, transient errors in network prediction may be detected and removed.

One or more embodiments may involve using domain-dependent assumptions (e.g., a person cannot switch from running to driving and back in a time span of a few seconds) to facilitate removing certain systematic errors.

In one or more embodiments, such error correction may be sent back to the network in order to perform one or more training iterations and parameter updates.

One or more embodiments may include applying a short, low-latency filter on a user interface UI possibly coupled with the system. It will be appreciated that, while shown in FIG. 1, the user interface UI may be a distinct element from the embodiments.

A system 10 as exemplified in FIG. 1 may receive input signals (briefly "inputs") IN from one or more sensors S for use in a classification procedure.

Accelerometers, gyroscopes, pressure/humidity sensors and, possibly, "virtual" sensors based on computations performed on signals from one or more "physical" sensors (e.g., orientation deduced from gravity acceleration) are exemplary of such sensors, which may be distinct elements from the embodiments.

A system 10 as exemplified in FIG. 1 may be installed (e.g., as an embedded system) in a device D (see FIG. 3).

A wearable device such as a Sensor Tile or Wearable Sensor Unit (WESU) may be exemplary of such a device D which may be modified to include one or more embodiments.

The blocks in the exemplary diagram of FIG. 1 are indicative of the following circuits/modules/functions, which may be implemented, for example, using circuitry, such as one or more processing cores, individual circuits, discrete circuitry, etc., or various combinations thereof:

100: classifier, receiving the inputs IN from associated sensor(s), and providing raw predictions RP;

102: short-time (low-latency) temporal filter receiving the output from the classifier 100, e.g., to drive the user interface UI;

104: long temporal filter receiving the output from the classifier 100;

106: sequence heuristics receiving the output from the classifier 100;

GT: "ground truth", that is a sequence of (corrected) predictions obtained by filtering the raw predictions RP from the classifier 100 via the long temporal filter 104 and the sequence heuristics 106;

108: ground truth (GT) selection (e.g., corrected predictions with a probability higher than a threshold and/or subset selected to have an equal number of samples for each class) to use in updating (re-training) the classifier model;

110: data logger (e.g., memory) receiving the inputs IN from the sensor(s) S as well as the output from the ground truth (GT) selection at 108;

112: update function of the classifier 100 driven by the GT selection function 108.

In one or more embodiments, a system 10 as exemplified in FIG. 1 may include one or more classification procedures (e.g., classifier 100) that receive the sensor readings (e.g., the inputs IN) and provide a prediction in the form of a probability distribution P over the target classes to be recognized.

In one or more embodiments, an "original" model may be provided trained on a large, clean dataset using high-quality and/or manually checked annotations.

In one or more embodiments, the interface UI may provide feedback to the user (e.g., type of movement of the user, ambient sound).

In one or more embodiments, the interface UI may include, e.g., a small screen, text-to-speech or sound interface.

In one or more embodiments, the interface UI may receive a prediction filtered over a small time interval at 102 (e.g., by smoothing the predicted probabilities or using some simple heuristic).

In one or more embodiments, the longer-term temporal filter 104 may store the sensor readings and the predicted probabilities from the classifier 100 (e.g., up to 10-15 minutes) and produce better predictions obtained by filtering over larger windows, e.g., by assuming that the changes of state have a (much) larger temporal scale than the classifier response time.

In one or more embodiments, domain-dependent heuristics (e.g., based on the recognition that a user's activity cannot suddenly switch, say, from running to driving without intermediate steps to standing or walking) may be applied at heuristics 106.

In one or more embodiments, sophisticated heuristics may be applied depending on the prediction patterns: for instance short biking intervals interspersed in a long walking stretch may be identified as likely to correspond to classification mistakes.

The exemplary value of 10-15 minutes referred to in the foregoing is compatible with synchronization delays in available products.

One or more embodiments may adopt different choices in implementing temporal filters (e.g., at 104).

A simple choice is a voting filter, where the selected class is the one that occurs more frequently in a temporal window.

If the temporal window is T steps long and $n_k$ is the number of predictions for class k, a selected class may be:

$$c(t) = \max_k n_k$$

Certain prediction models may return probabilities for each class, which represent how likely the prediction would be true.

An approach in one or more embodiments is to average (all) the probabilities $p_k(t)$ for class k at a given time t over the T steps of the window and only then finding the most likely class c(t) at the time t.

$$c(t) = \max_k \sum_{s=1}^{T} p_k(t-s)$$

In one or more embodiments, an average may be implemented by using an exponential average:

$$\hat{p}_k(t) = \alpha p_k(t) + (1-\alpha)\hat{p}_k(t-1)$$

where $\hat{p}$ is the currently estimated average and $\alpha$ is a coefficient representing the "inverse effective window length", e.g., if $\alpha=0.01$ the average will roughly depend on the last 100 samples.

In one or more embodiments, the value for $\alpha$ may be adapted on the likelihood of the last prediction, e.g., by using larger values for more confident predictions and smaller values for less confident predictions.

In that case $\alpha$ may be an increasing function of the most likely prediction, that is:

$$\alpha(t) = f\left(\max_k p_k(t)\right)$$

It is noted that operation of such temporal filters may benefit from the absence of class changes over a relatively long time period, allowing errors to average out, at the expense of an increased latency and prediction errors introduced near class transitions.

In one or more embodiments, a different procedure may be used to independently estimate when a "regime" change has occurred, e.g., by estimating an Autoregressive Moving Average model (ARMA) on short stretches of data (which can be assumed to come from signals belonging to a same class) and checking when the predictions exceed a given threshold thr.

$$\hat{y}(t) = a_1 y(t-1) + \ldots + a_p y(t-p) |\hat{y}(t) - y(t)| > \text{thr}$$

where y(t) is the signal at time time, ŷ(t) is its estimate from the ARMA model and y(t) are the coefficients of the ARMA model.

In one or more embodiments, with the classifier 100 less "confident" around transitions, changes may be detected by searching short intervals where the filtered probabilities are all below a given threshold.

Once the changes have been detected, temporal filter(s) 104 may be aligned to the changes, e.g., by setting the value of T in order to fit the temporal window on homogeneous signals.

In one or more embodiments, while capable of removing transient errors caused by noise or incorrect predictions, the temporal filters (e.g., 104) may be unable to take into account knowledge about the problem and to correct systematic estimation errors, such as a class predicted with much higher probability than the others. This behavior may be related, e.g., to errors introduced in the mean value.

In order to reduce errors, one or more embodiments may adopt a simplified model and correct those predictions which may be found to be inconsistent with a heuristics.

While—as schematically shown in FIG. 1—heuristic filters (e.g., 106) may be applied to the raw predictions from a classifier, one or more embodiments may benefit from heuristic filters 106 being applied in a cascaded fashion with a temporal filter (e.g., after a temporal filter and after alignment on transition boundaries).

In one or more embodiments, transitions between one class (start) and another (destination) may be confirmed (only) after a given number of predictions of the destination class over a temporal window have been found, with the predictions over a maximum time interval over all the pairs stored in a queue.

In one or more embodiments, the size of the temporal window and the number of confirmations may depend on the pair of classes (source, destination) considered. Also, if certain transitions are held to be unlikely or even impossible (e.g., in human activity recognition, suddenly changing from biking to driving) the number of confirmations may be conventionally set to infinity. In a simplified version, the map of window sizes and confirmations may depend (only) on the destination class.

In one or more embodiments, a filter may exploit the fact that potential estimation errors are known at training time from the so-called confusion matrix, which indicates the percentage of predictions for each pair of (predicted, true) class, with an ideally perfect classifier having a diagonal confusion matrix with all values equal to 1.

In one or more embodiments, given an interval between two detected changes, the filter may estimate the distribution of predictions over a certain interval, e.g., by counting the occurrences or by estimating the parameters of a multinomial distribution over the predictions.

In one or more embodiments, the mis-classification pairs (predicted, true) known to occur from the confusion matrix and that have an estimated probability higher than a threshold may be corrected by replacing the predicted class with the estimated true class. p In one or more embodiments, the application of temporal filters (e.g., 104) and heuristic filters (e.g., 106) on the (raw) predictions from the classifier 100 may produce a new sequence of predictions, which differs from the original sequence in the samples where the filters corrected the prediction.

In one or more embodiments, these differences may provide a set of candidate ground truth values (GT) for possible use in re-training the model.

For instance, for filters which encode the confidence of the correction, such as the temporal filters (e.g., 104) based on averaged probabilities, only the corrections with probability higher that a threshold may be selected in one or more embodiments.

Moreover, in one or more embodiments, only a subset of all the potential ground truths may be selected (e.g., at 108) to have an equal number of samples for each class to facilitate a balanced re-training of the model (e.g., via the update function 112).

In one or more embodiments, together with the production of the filtered prediction sequence P, a system 100 as exemplified in FIG. 1 may keep a sequence of the original input samples (IN) fed to the classifier 100.

In one or more embodiments, this may occur in a data log module 110, e.g., with a 1:1 correspondence between input samples IN and predictions P in the filtered sequence.

For instance, in one or more embodiments, when a list of candidate ground truths GT is produced, the corresponding input samples IN may be extracted from the data log module 110 to form a set of (input, true_prediction) pairs which may be added to the training set for the model.

In one or more embodiments, the filtered predictions P may be produced with a delay which may be long in comparison with the input data acquisition (e.g., after 10-15 minutes depending on the length of the filters 104, 106), and thus the training pairs will be produced with a delay.

In one or more embodiments, after a batch of predictions P and corresponding input data IN have been filtered and the ground truths GT produced, the logs at 110 may be cleared to reduce memory requirements for the system.

In one or more embodiments, the amount of memory included in the system 10 may be a function of the data rate and the maximum delay of the filters.

In one or more embodiments, a supervised re-training of the model, e.g., via the update function 112 may be performed after a sufficient number of training pairs have been collected.

In one or more embodiments, an update function 112 may be implemented on the basis of criteria which are per se conventional, e.g., in view of the intended application of the system.

For instance, in one or more embodiments as exemplified herein, the classifier 100 (more to the point, the classification procedure implemented therein) may be trained using a stochastic gradient descent (SGD).

This may beneficial for various reasons, e.g.:

an embodiment may be inherently an online approach, so a model can be updated as soon as new data become available;

a single update function of the loss ("backward pass" in neural network parlance) may be stored in addition to the classification model in order to train the model.

For instance, in one or more embodiments, a certain number of mistaken predictions may be selected with their corresponding input data and organized in groups (batches). The error over the batch may be back-propagated to the parameters using the update function in each iteration, and multiple iterations may be performed with one or more passes over the available batches. After this (short) training step, the model parameters may replaced with the new ones.

FIG. 2 is an exemplary diagram of an update function 112 for a complex model including several classification layers $100a, 100b, \ldots, 100n$, as is the case for modern neural network architectures.

In one or more embodiments, the sensor inputs (e.g., IN), e.g., as logged at 110 may be used to produce a new prediction RP and the estimated ground truth GT used to compute an error e which may be averaged over a number of different inputs.

In one or more embodiments, an update function 112 may include a function which computes a term $\Delta w_i = f_i(e)$ i= 1, . . . , n to be added to the current model parameters, and e is the error calculated from the predictions RP and the ground truth GT.

In one or more embodiments, the function may be sensitive to the contribution of each parameter to the error; e.g., in the case of classifier 100 adopting a neural network layout, it may take a form such as, e.g.:

$$\Delta w_i \approx \frac{\partial L}{\partial w_i}(w_i, x) = \left(\frac{\partial L}{\partial o} \cdot \frac{\partial o}{\partial w_i}\right)(w_i, x)$$

where $w_i$ is the current parameter being updated, L is a loss factor (a function of error e expressed as a function of parameters and inputs), o is the output of the classifier network 100 (e.g., predicted probabilities RP) and x is the sensor input (IN in FIG. 1).

For instance, FIG. 2 may be regarded as an exemplary representation of the update block 112 in FIG. 1, wherein, in order to update the parameters in the classifier 100, a prediction is produced to compute the error by means of GT.

As discussed in the following, one or more embodiments may involve computing the predictions without logging the data IN (that is, only the predictions are stored). Predictions however depend on the current weights: if only the predictions are stored, after updating the weights, original data are used to produce new predictions (that is, the predictions stored are "burnt").

As shown by the formula above, an increasing error will produce a correspondingly increased variation in the parameters $w_i$ and a larger update.

It was noted that a prediction model as discussed herein may be subject to drift, that is, a gradual loss of performance due, e.g., to systematic errors in the (high-quality) predictions and/or bias over erroneous/ambiguous examples that shifts the sample distribution and reduces the generalization ability of the model.

In order to correct this, one or more embodiments may include a stability objective in the loss function, e.g., by storing the predictions of the original model on reference data and forcing the new model to have the same behavior. See Li, Z., & Hoiem, D., *Learning without Forgetting*, Arxiv 1606.09282 (2016). As a result, such change may be already incorporated in the update function, without adversely affecting performance.

One or more embodiments as exemplified herein may include a log (e.g., at 110) of the sensor readings IN over a temporal window, while an update function 112 as discussed previously may use (e.g., only) the prediction error as an input. In one or more embodiments, the model parameters may be still updated with only the predicted probabilities RP stored.

In one or more embodiments, the predictions RP may be linked to a specific model and thus, as soon as the parameters are updated, the computed error may no longer be valid. However, these data can still be used, e.g., for a single iteration of the training algorithm. For instance, if the classification procedure computes a prediction among, say, five classes every second based on, e.g., 16 Hz accelerometer data, data storage requirements may be reduced, e.g., by a factor of 10× (e.g., from 48 to 5 floats per second).

As noted, one or more embodiments may enable a continuous update of a classifier 100 on board of an embedded device. The training procedure may not involve contacting a remote server, thus making it possible to avoid communicating and storing user data, thus offering a form of privacy-preserving learning as a by-product. See, McMahan, H. B., Moore, E., Ramage, D., & Arcas, B. A. y., *Federated Learning of Deep Networks using Model Averaging*, Arxiv 1602.05629 (2016).

A method according to one or more embodiments may include:

receiving sensor data (e.g., IN) from a set of sensors (e.g., S), running a context classifier (e.g., 100) of said sensor data to produce therefrom raw predictions (e.g., RP), wherein said context classifier (100) includes a set of classifier model parameters, applying to said raw predictions temporal filtering (e.g., 104) as well heuristic filtering (e.g., 106) to produce filtered predictions (e.g., GT, 108), calculating a prediction error (e.g., e) from said filtered predictions, updating (e.g., at 112) said context classifier by applying, to parameters in said set of classifier model parameters, updates (e.g., $\Delta w_i$) calculated as a function of said prediction error.

In one or more embodiments, said temporal filtering may include filtering said raw predictions over a time window facilitating averaging out of prediction errors.

In one or more embodiments, said temporal filtering may include one or more of:

voting filtering to select a raw prediction occurring more frequently over a time window, averaging to select a most likely raw prediction over a time window.

One or more embodiments may include:

detecting class transitions in said context classifier, and aligning said time window for temporal filtering with said class transitions in said context classifier.

In one or more embodiments, said heuristic filtering may include selecting transitions between a source class and a destination class in said context classifier for which a number of predictions of the destination class reaching a confirmation threshold have been detected over a temporal window.

In one or more embodiments, said heuristic filtering may include:

providing a confusion matrix identifying mis-classification pairs in said context classifier, detecting mis-classification pairs in said raw predictions having a probability higher than a mis-classification threshold and replacing the raw predicted class therein with an estimated true class.

One or more embodiments may include applying said heuristic filtering following temporal filtering.

One or more embodiments may include:

applying low-latency filtering (e.g., 102) to said raw predictions, presenting said low-latency filtered raw predictions as user feedback (e.g., UI).

In one or more embodiments, said raw predictions may include probability distributions over recognizable target classes.

In one or more embodiments, said calculating a prediction error from the filtered predictions may include calculating said prediction error from a subset of said filtered predictions, said subset selected (e.g., at 108) by:

wherein said raw predictions include probability distributions over recognizable target classes, selecting predictions with a probability higher than a selection threshold, and/or having the selected subset including an equal number of samples for each class in said classifier.

One or more embodiments may include:

logging (e.g., at 110) a sequence of said sensor data corresponding to a set of respective filtered predictions, forming a set of sensor data/filtered predictions pairs, adding said set of sensor data/filtered predictions pairs to the training set for said context classifier.

In one or more embodiments, a system may include:

a context classifier (e.g., a neural network) for receiving sensor data from a set of sensors and producing therefrom raw predictions, wherein said context classifier includes a set of classifier model parameters, temporal filtering and heuristic filtering circuits for receiving said raw predictions and producing filtered predictions therefrom, an update module for calculating a prediction error from said filtered predictions and updating said context classifier by applying to parameters in said set of classifier model parameters updates calculated as a function of said prediction error, the system configured for operating with the method of one or more embodiments.

One or more embodiments may include a device (e.g., D), optionally of the wearable type, including:

a system according to one or more embodiments, a set of sensors (e.g., S) coupled with said system to provide said sensor data to said context classifier network.

A device according to one or more embodiments may include a user interface for presenting user feedback indicative of said raw predictions.

One or more embodiments may include a computer product program loadable in the memory of at least one processing module (e.g., the system 10) and including software code portions for executing the steps of the method of one or more embodiments.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Without prejudice to the underlying principles, the details and embodiments may vary, even significantly, with respect to what has been disclosed by way of example only, without departing from the extent of protection.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

receiving sensor data from a set of sensors including at least one inertial data sensor;

generating, using a context classifier of a neural network having a set of classifier model parameters of a user-activity classification model, a set of raw predictions based on the received sensor data; and generating one or more control signals to control a user interface based on the set of raw predictions, wherein the generating the set of raw predictions includes:

applying to the raw predictions temporal filtering and heuristic filtering, producing filtered predictions;

generating a prediction error from the filtered predictions; and updating model parameters of the set of classifier model parameters based on the prediction error;

wherein the heuristic filtering includes selecting transitions between a source class and a destination class in the context classifier for which a number of predictions of the destination class reaching a confirmation threshold have been detected over a temporal window, the temporal window has a defined duration, and the confirmation threshold is a threshold number of predictions.

2. The method of claim 1, wherein said temporal filtering includes filtering said raw predictions over a time window.

3. The method of claim 1, wherein said temporal filtering of said raw predictions includes one or more of:

voting filtering to select a raw prediction occurring more frequently over a time window; and averaging to select a most likely raw prediction over a time window.

4. The method of claim 2, comprising:

detecting class transitions in said context classifier; and aligning said time window with said class transitions.

5. The method of claim 1, wherein said heuristic filtering includes:

providing a confusion matrix identifying mis-classification pairs in said context classifier; and detecting mis-classification pairs in said raw predictions having a probability higher than a mis-classification threshold and replacing a raw predicted class associated with a detected mis- classification pair with an estimated true class.

6. The method of claim 1, comprising applying said heuristic filtering following said temporal filtering.

7. The method of claim 1, comprising:

applying low-latency filtering to said raw predictions; and presenting said low-latency filtered raw predictions as user feedback.

8. The method of claim 1, wherein said raw predictions include probability distributions over recognizable target classes.

9. The method of claim 1, wherein said generating a prediction error from the filtered predictions includes selecting a subset of said filtered predictions and generating said prediction error from the subset of said filtered predictions, the selecting the subset including at least one of:

when said raw predictions include probability distributions over recognizable target classes, selecting predictions with a probability higher than a selection threshold; and including in the selected subset an equal number of samples for each class in said classifier.

10. The method of claim 1, comprising:

logging a sequence of said sensor data corresponding to a set of respective filtered predictions;

forming a set of sensor data/filtered predictions pairs; and adding said set of sensor data/filtered predictions pairs to a training set for said context classifier.

11. A system, comprising:
a memory; and
circuitry coupled to the memory, the circuitry including neural-network classification circuitry and control circuitry, wherein the classification circuitry, in operation:
receives inertial sensor data;
generates, using a set of classifier model parameters of a user-activity classification model, a set of raw predictions based on the received inertial sensor data;
filters the raw predictions using temporal filtering and heuristic filtering, producing filtered predictions;
generates a prediction error from said filtered predictions; and
updates model parameters of said set of classifier model parameters based on said prediction error; and
the control circuitry, in operation, generates one or more control signals to control a user interface based on the set of raw predictions; wherein
the heuristic filtering includes selecting transitions between a source class and a destination class in the context classifier for which a number of predictions of the destination class reaching a confirmation threshold have been detected over a temporal window,
the temporal window has a defined duration, and
the confirmation threshold is a threshold number of predictions.

12. The system of claim 11, wherein said temporal filtering includes filtering said raw predictions over a time window.

13. The system of claim 12, wherein said temporal filtering of said raw predictions includes one or more of:
voting filtering to select a raw prediction occurring more frequently over a time window; and
averaging to select a most likely raw prediction over a time window.

14. The system of claim 12, wherein the classification circuitry, in operation:
detects class transitions in the raw predictions; and
aligns said time window with said detected class transitions.

15. The system of claim 11, wherein said heuristic filtering includes:
providing a confusion matrix identifying mis-classification pairs; and
detecting a mis-classification pair in said raw predictions having a probability higher than a mis-classification threshold and replacing a raw predicted class associated with the detected mis-classification pair with an estimated true class.

16. The system of claim 11, wherein the classification circuitry, in operation, applies said heuristic filtering following said temporal filtering.

17. The system of claim 11, wherein the control circuitry, in operation:
applies low-latency filtering to said raw predictions;
generates user-feedback based on said low-latency filtered raw predictions.

18. The system of claim 11, wherein said raw predictions include probability distributions over recognizable target classes.

19. The system of claim 11, wherein said classification circuitry, in operation, selects a subset of said filtered predictions and generates said prediction error from the subset of said filtered predictions, the selecting the subset including at least one of:
when said raw predictions include probability distributions over recognizable target classes, selecting predictions with a probability higher than a selection threshold; and
including in the selected subset an equal number of samples for each classification class.

20. The system of claim 11, wherein the classification circuitry, in operation:
logs a sequence of said sensor data corresponding to a set of respective filtered predictions;
forms a set of sensor data/filtered predictions pairs; and
adds said set of sensor data/filtered predictions pairs to a training set to train the classification circuitry.

21. The system of claim 11, comprising:
a set of inertial sensors coupled to the classification circuitry, wherein the set of inertial sensors, in operation, generates the inertial sensor data.

22. The system of claim 21, wherein the user interface, in operation, provides user feedback indicative of the raw predictions based on the one or more control signals.

23. The system of claim 22, comprising: a wearable device including at least the set of inertial sensors and the user interface.

24. A non-transitory computer-readable medium having contents which configure processing circuitry including neural network classification circuitry to perform a method, the method comprising:
generating, using a user-activity classification model including a set of classifier model parameters, a set of raw predictions based on inertial sensor data; and
generating one or more control signals to control a user interface based on the set of raw predictions, wherein the generating the set of raw predictions includes:
applying to said raw predictions temporal filtering and heuristic filtering, producing filtered predictions;
generating a prediction error from said filtered predictions; and
updating model parameters of said set of classifier model parameters based on said prediction error; wherein
said heuristic filtering includes selecting transitions between a source class and a destination class for which a number of predictions of the destination class reaching a confirmation threshold have been detected over a temporal window,
the temporal window has a defined duration, and
the confirmation threshold is a threshold number of predictions.

25. The non-transitory computer-readable medium of claim 24 claim 24, wherein said temporal filtering includes filtering said raw predictions over a time window.

26. The non-transitory computer-readable medium of claim 24, wherein the contents comprise instructions executed by the processing circuitry.

27. The method of claim 1, wherein the generating one or more control signals comprises filtering the set of raw predictions.

28. The system of claim 11, comprising the user interface, wherein the control circuitry, in operation:
filters the raw predictions; and
drives the user interface using the filtered raw predictions.

* * * * *

UNITED STATES PATENT AND TRADEMARK OFFICE
CERTIFICATE OF CORRECTION

PATENT NO. : 11,960,988 B2
APPLICATION NO. : 15/903605
DATED : April 16, 2024
INVENTOR(S) : Emanuele Plebani et al.

Page 1 of 1

It is certified that error appears in the above-identified patent and that said Letters Patent is hereby corrected as shown below:

In the Claims

Column 16, Claim 25, Lines 51-52:
"of claim 24 claim 24, wherein"
Should read:
--of claim 24, wherein--.

Signed and Sealed this
Eighteenth Day of June, 2024

Katherine Kelly Vidal
*Director of the United States Patent and Trademark Office*